US011509708B2

(12) United States Patent
Wang et al.

(10) Patent No.: US 11,509,708 B2
(45) Date of Patent: Nov. 22, 2022

(54) APPLICATION SHARING METHOD AND APPARATUS

(71) Applicant: Huawei Device Co., Ltd., Guangdong (CN)

(72) Inventors: Chan Wang, Shenzhen (CN); Huangwei Wu, Shenzhen (CN); Xi Huang, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

(21) Appl. No.: 16/828,498

(22) Filed: Mar. 24, 2020

(65) Prior Publication Data

US 2020/0228590 A1 Jul. 16, 2020

Related U.S. Application Data

(63) Continuation of application No. 14/933,251, filed on Nov. 5, 2015, now Pat. No. 10,630,757, which is a (Continued)

(30) Foreign Application Priority Data

Jun. 3, 2013 (CN) .......................... 201310216485.3

(51) Int. Cl.
*G06F 3/04842* (2022.01)
*H04L 67/06* (2022.01)
(Continued)

(52) U.S. Cl.
CPC .......... *H04L 67/06* (2013.01); *G06F 3/04817* (2013.01); *G06F 3/04842* (2013.01); *H04L 67/34* (2013.01)

(58) Field of Classification Search
CPC ..... H04L 67/06; H04L 67/34; G06F 3/04817; G06F 3/04842; G06F 16/955
See application file for complete search history.

(56) References Cited

U.S. PATENT DOCUMENTS 8,850,422 B2 9/2014 Chang
2002/0032745 A1 3/2002 Honda
(Continued)

FOREIGN PATENT DOCUMENTS

CN 101321179 A 12/2008
CN 101888620 A 11/2010
(Continued)

OTHER PUBLICATIONS

Foreign Communication From a Counterpart Application, European Application No. 14807684.7, Extended European Search Report dated Jul. 20, 2016, 12 pages.
(Continued)

*Primary Examiner* — Jennifer N Welch
*Assistant Examiner* — Amy P Hoang
(74) *Attorney, Agent, or Firm* — Coley Rose, P.C.

(57) ABSTRACT

An application sharing method includes obtaining a distance between an icon of a first application and an icon of a second application, where the first application is a to-be-shared application, and the second application is used to share the first application; determining whether the distance is less than a preset distance; if the distance is less than the preset distance, obtaining application information of the first application in an application store on the Internet, and obtaining information about a to-share-with user, where the application information includes a link address of the first application in the application store; and sending the link address to the to-share-with user by using the second application.

17 Claims, 10 Drawing Sheets

Related U.S. Application Data continuation of application No. PCT/CN2014/079041, filed on Jun. 3, 2014.

(51) Int. Cl.
*H04L 67/00* (2022.01)
*G06F 3/04817* (2022.01)

(56) References Cited

U.S. PATENT DOCUMENTS

| | | |
|---|---|---|
| 2010/0274858 A1 | 10/2010 | Lindberg et al. |
| 2010/0312817 A1* | 12/2010 | Steakley ............ G06F 8/61 709/202 |
| 2011/0018827 A1 | 1/2011 | Wang et al. |
| 2012/0026201 A1 | 2/2012 | Amano |
| 2012/0072283 A1 | 3/2012 | Devore et al. |
| 2012/0124524 A1* | 5/2012 | Frank Szarfman ... G06F 40/166 715/843 |
| 2012/0159334 A1* | 6/2012 | Messerly ............ G06F 9/543 715/733 |
| 2012/0159472 A1 | 6/2012 | Hong et al. |
| 2012/0265827 A9 | 10/2012 | Hansson et al. |
| 2013/0225087 A1* | 8/2013 | Uhm ................. H04W 4/12 455/41.3 |
| 2013/0318582 A1* | 11/2013 | McCann ........... G06F 21/41 726/7 |
| 2014/0172911 A1* | 6/2014 | Cohen ................ H04W 4/00 707/770 |
| 2015/0026275 A1 | 1/2015 | Zhang |
| 2015/0141065 A1 | 5/2015 | Park et al. |

FOREIGN PATENT DOCUMENTS

| | | |
|---|---|---|
| CN | 101968695 A | 2/2011 |
| CN | 102460388 A | 5/2012 |
| CN | 102546835 A | 7/2012 |
| CN | 102572096 A | 7/2012 |
| CN | 102999379 A | 3/2013 |
| CN | 103119968 A | 5/2013 |
| EP | 2988208 A1 | 2/2016 |
| WO | 2007131540 A1 | 11/2007 |
| WO | 2008110188 A1 | 9/2008 |
| WO | 2009109980 A2 | 9/2009 |
| WO | 2010141217 A1 | 12/2010 |

OTHER PUBLICATIONS

Foreign Communication From a Counterpart Application, PCT Application No. PCT/CN2014/079041, English Translation of International Search Report dated Aug. 27, 2014, 2 pages.

* cited by examiner

APPLICATION SHARING METHOD AND APPARATUS

CROSS-REFERENCE TO RELATED APPLICATIONS

This application is a continuation of U.S. patent application Ser. No. 14/933,251 filed on Nov. 5, 2015, which is a continuation of International Patent Application No. PCT/CN2014/079041 filed on Jun. 3, 2014, which claims priority to Chinese Patent Application No. 201310216485.3 filed on Jun. 3, 2013. All of the aforementioned applications are hereby incorporated by reference in their entireties.

TECHNICAL FIELD

The present disclosure relates to the field of communications technologies, and in particular, to an application sharing method and apparatus.

BACKGROUND

With the development of smartphones, applications on a terminal are increasing. Generally, when needing an application, a user downloads the application from an application store. After the application is installed on a terminal, the user may further share, by using the terminal, an application that rates high with another terminal for use (that is, share a link address Uniform Resource Locator (URL) of the application with the another terminal). The user shares an application with another terminal in the following manner, which is specifically:

Some applications have a sharing function, and a terminal can share a link address URL of a to-be-shared application with another terminal by using a built-in sharing function of the application. Specifically, if the user considers an application good, the user may select a "share" label in a "setting" option of the application. Such a built-in "sharing" function of an application supports sharing by the user a link address URL of the application with a friend in multiple manners, which, for example, may include: the user is allowed to send the link address URL of the application to the friend by using a short message service, email, BLUETOOTH, instant messaging, or the like.

However, not all applications have a sharing function; therefore, the manner of sharing an application by using a sharing function of the application lacks universality, and the user cannot share an application without a sharing function with a friend.

SUMMARY

Embodiments of the present disclosure provide an application sharing method and apparatus, which can implement sharing of any application.

To achieve the foregoing objective, the embodiments of the present disclosure use the following technical solutions:

According to a first aspect, an application sharing method is provided, where the method includes: obtaining a distance between an icon of a first application and an icon of a second application, where the first application is a to-be-shared application, and the second application is used to share the first application; determining whether the distance is less than a preset distance; if the distance is less than a preset distance, obtaining application information of the first application in an application store on the Internet, and obtaining information about a to-share-with user, where the application information includes a link address of the first application in the application store; and sending the link address to the to-share-with user by using the second application.

With reference to the first aspect, in a first possible implementation manner of the first aspect, the icon of the second application is displayed on a display unit after the icon of the first application is selected.

With reference to the first aspect or the first possible implementation manner of the first aspect, in a second possible implementation manner of the first aspect, the second application is a communications application, a social application, or the application store.

With reference to the first aspect or the first possible implementation manner or the second possible implementation manner of the first aspect, in a third possible implementation manner of the first aspect, if the second application is a communications application, the obtaining information about a to-share-with user includes: obtaining the information about the to-share-with user by using the second application; or if the second application is a social application, the obtaining information about a to-share-with user includes: obtaining the information about the to-share-with user by using the second application, where the information about the to-share-with user is stored in a file related to the second application.

With reference to the first aspect, in a fourth possible implementation manner of the first aspect, the application information further includes evaluation information on the first application; and after the determining whether the distance is less than a preset distance, the method further includes: if the distance is less than the preset distance, sending the evaluation information to the application store by using the second application.

With reference to the first aspect, in a fifth possible implementation manner of the first aspect, the obtaining application information of the first application in an application store on the Internet includes: obtaining the link address of the first application from an installation package of the first application according to an identifier of the first application; or obtaining the link address of the first application from a stored table of correspondences between identifiers and link addresses of installed applications according to an identifier of the first application; or obtaining the link address of the first application from the application store on the Internet according to an identifier of the first application, where the application store on the Internet stores a table of correspondences between identifiers and link addresses of applications.

According to a second aspect, an application sharing apparatus is provided, where the apparatus includes: a first obtaining unit configured to obtain a distance between an icon of a first application and an icon of a second application, where the first application is a to-be-shared application, and the second application is used to share the first application; a determining unit configured to determine whether the distance is less than a preset distance; a second obtaining unit configured to: if the distance is less than the preset distance, obtain application information of the first application in an application store on the Internet, and obtain information about a to-share-with user, where the application information includes a link address of the first application in the application store; and a first sending unit configured to send the link address to the to-share-with user by using the second application.

With reference to the second aspect, in a first possible implementation manner of the second aspect, the apparatus further includes a display unit, and the icon of the second application is displayed on the display unit after the icon of the first application is selected.

With reference to the second aspect or the first possible implementation manner of the second aspect, in a second possible implementation manner of the second aspect, the second application is a communications application, a social application, or the application store.

With reference to the second aspect or the first possible implementation manner or the second possible implementation manner of the second aspect, in a third possible implementation manner of the second aspect, the second obtaining unit is specifically configured to: if the second application is a communications application, obtain the information about the to-share-with user by using the second application; or the second obtaining unit is further configured to: if the second application is a social application, obtain the information about the to-share-with user by using the second application, where the information about the to-share-with user is stored in a file related to the second application.

With reference to the second aspect, in a fourth possible implementation manner of the second aspect, the application information obtained by the second obtaining unit further includes evaluation information on the first application; and the apparatus further includes a second sending unit configured to after the determining unit determines whether the distance is less than the preset distance, if the distance is less than the preset distance, send the evaluation information to the application store.

With reference to the second aspect, in a fifth possible implementation manner of the second aspect, the second obtaining unit is specifically configured to obtain the link address of the first application from an installation package of the first application according to an identifier of the first application; or obtain the link address of the first application from a stored table of correspondences between identifiers and link addresses of installed applications according to an identifier of the first application; or obtain the link address of the first application from the application store on the Internet according to an identifier of the first application, where the application store on the Internet stores a table of correspondences between identifiers and link addresses of applications.

According to the application sharing method and apparatus provided by the embodiments of the present disclosure, after the foregoing solutions are used, an icon of a second application that can be used to share a first application is displayed on a display unit, and a user can move a position of an icon of the first application on the display unit, and implements and triggers sharing of the first application according to a distance between the icon of the first application and the icon of the second application, that is, triggers sharing of the first application by using the second application. In this way, any application can be shared.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
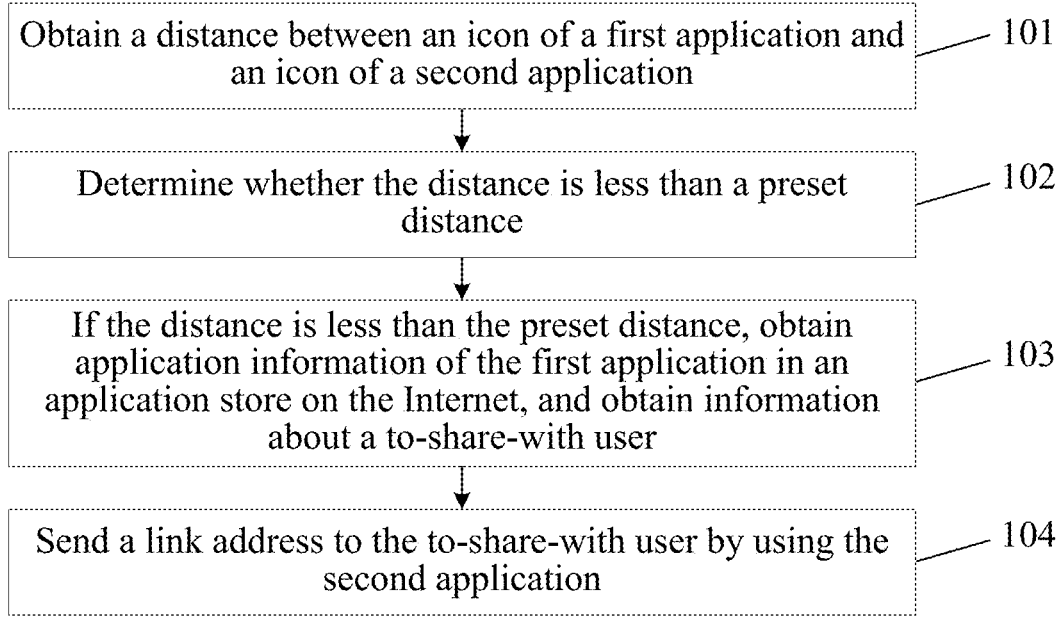
FIG. 1 is a flowchart of an application sharing method according to an embodiment.

To resolve the problem put forward in the background, an embodiment provides an application sharing method. The method can be applied to, but not limited to, an electronic device. The electronic device may include a display unit. The display unit can be used to, but not limited to, display an icon of a first application. The first application is a to-be-shared application. As shown in FIG. 1, the method may include the following.

101. Obtain a distance between the icon of the first application and an icon of a second application.

The first application is a to-be-shared application, and the second application is used to share the first application.

As an implementation manner of this embodiment, when a user needs to share the first application by using the second application, the user may drag the icon of the first application to the icon of the second application, and when the distance between the icon of the first application and the icon of the second application is less than a preset distance, the user may share the first application by using the second application.

102. Determine whether the distance is less than a preset distance, and if the distance is less than the preset distance, perform step 103; if the distance is not less than the preset distance, perform step 101.

The preset distance is not limited in this embodiment, and may be set according to actual requirements. For example, the preset distance may be, but is not limited to, 0.5 centimeter. Details are not described herein again.

103. If the distance is less than the preset distance, obtain application information of the first application in an application store on the Internet, and obtain information about a to-share-with user.

The application information may include, but is not limited to, a link address of the first application in the application store.

As an implementation manner of this embodiment, if the distance between the icon of the first application and the icon of the second application is less than the preset distance, an operation of sharing the first application is triggered, that is, the link address of the first application may be sent to the to-share-with user.

104. Send the link address to the to-share-with user by using the second application.

After the foregoing solution is used, an icon of a second application that can be used to share a first application is displayed on a display unit, and a user can move a position of an icon of the first application on the display unit, and implements and triggers sharing of the first application according to a distance between the icon of the first application and the icon of the second application, that is, triggers sharing of the first application by using the second application. In this way, any application can be shared.

Figure 2:
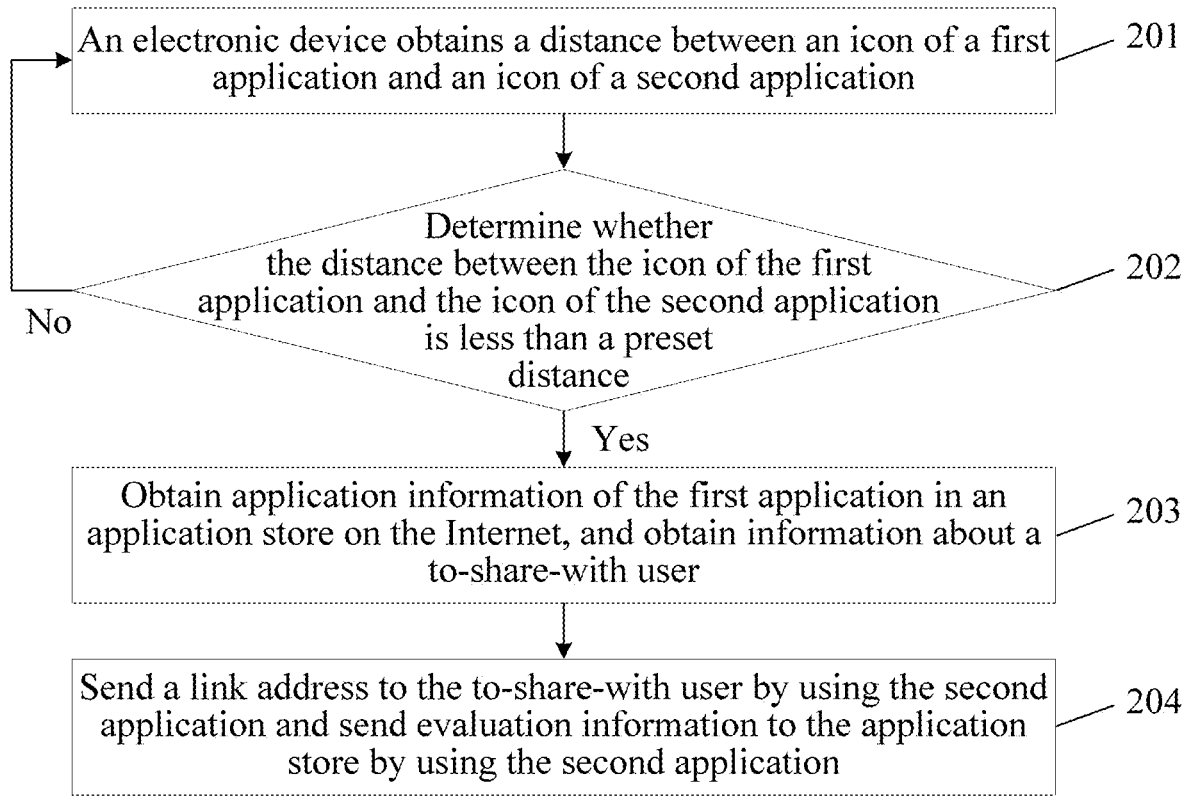
FIG. 2 is a flowchart of another application sharing method according to an embodiment.

An embodiment provides another application sharing method. This method is a further extension of the method shown in FIG. 1. As shown in FIG. 2, the method may include the following.

201. Obtain a distance between an icon of a first application and an icon of a second application.

The first application is a to-be-shared application, and the second application is used to share the first application.

As an implementation manner of this embodiment, when a user needs to share the first application by using the second application, the user may drag the icon of the first application to the icon of the second application, and when the distance between the icon of the first application and the icon of the second application is less than a preset distance, the user may share the first application by using the second application.

As an implementation manner of this embodiment, an electronic device may periodically obtain a position coordinate of the icon of the first application and that of the icon of the second application, which are displayed on a display unit, and calculates the distance between the two icons by using the position coordinates.

A method for obtaining the distance between the icon of the first application and the icon of the second application is not limited in this embodiment, and is a technology well known by a person skilled in the art and may be set according to actual requirements, and details are not described herein again.

Further, the icon of the second application may be displayed on the display unit all the time.

Further, the icon of the second application may also be displayed on the display unit after the icon of the first application is selected.

As an implementation manner of this embodiment, after the icon of the first application is selected, a fuzzy layer is added to all areas displayed on the display unit except the icon of the first application, and the corresponding icon of the second application is displayed at the fuzzy layer.

A method and a position for displaying the icon of the second application are not limited in this embodiment, and may be set according to actual requirements, and details are not described herein again.

Further, the second application may be, but is not limited to, a communications application, a social application, or an application store.

202. Determine whether the distance is less than a preset distance, and if the distance is less than the preset distance, perform step 203; if the distance is not less than the preset distance, perform step 201.

203. Obtain application information of the first application in an application store on the Internet, and obtain information about a to-share-with user.

As an implementation manner of this embodiment, if the distance between the icon of the first application and the icon of the second application is less than the preset distance, an operation of sharing the first application is triggered, that is, a link address of the first application may be sent to the to-share-with user.

Further, the application information may include, but is not limited to a link address of the first application in the application store and evaluation information on the first application.

As an implementation manner of this embodiment, the application store on the Internet may store the application information of the first application, which may include, for example, the link address, the evaluation information, a screenshot of a running application, and a keyword.

Further, the obtaining application information of the first application in an application store on the Internet includes obtaining the link address of the first application from an installation package of the first application according to an identifier of the first application; or obtaining the link address of the first application from a stored table of correspondences between identifiers and link addresses of installed applications according to an identifier of the first application; or obtaining the link address of the first application from the application store on the Internet according to an identifier of the first application, where the application store on the Internet stores a table of correspondences between identifiers and link addresses of applications.

Further, if the second application is a communications application, the obtaining information about a to-share-with user includes obtaining the information about the to-share-with user by using the second application.

Further, if the second application is a social application, the obtaining information about a to-share-with user includes obtaining the information about the to-share-with user by using the second application, where the information about the to-share-with user is stored in a file related to the second application.

204. Send the link address to the to-share-with user by using the second application and send the evaluation information to the application store by using the second application.

As an implementation manner of this embodiment, when the distance between the first application and the second application is less than the preset distance, the second application may be triggered and started; the second application may obtain the link address of the first application from the application store according to the identifier of the first application; and after the information about the to-share-with user is obtained, the first application is sent to the to-share-with user by using the second application.

The application store is not limited in this embodiment, and is a technology well known by a person skilled in the art and may be set according to actual requirements, and details are not described herein again.

After the foregoing solution is used, an icon of a second application that can be used to share a first application is displayed on a display unit, and a user can trigger sharing of the first application by operating the icon of the first application, that is, trigger sharing of the first application by using the second application. In this way, any application can be shared, and operation steps for triggering sharing are simplified. Moreover, an electronic device may further select, by using a communications application, a specified friend to share with, and may share the first application with the specified friend. In addition, evaluation information on the first application may also be sent to an application store, so that another user obtains the evaluation information on the first application from the application store.

To describe the solution more clearly and more completely, some specific embodiments in which the solution is applied to some scenarios are provided below.

An embodiment provides another application sharing method. The method is a specific limitation and step extension of the steps shown in FIG. 1 and FIG. 2. The following are specific steps of the method applied to three scenarios, where in the following three scenarios, an execution body being an electronic device is described as an example.

Figure 3:
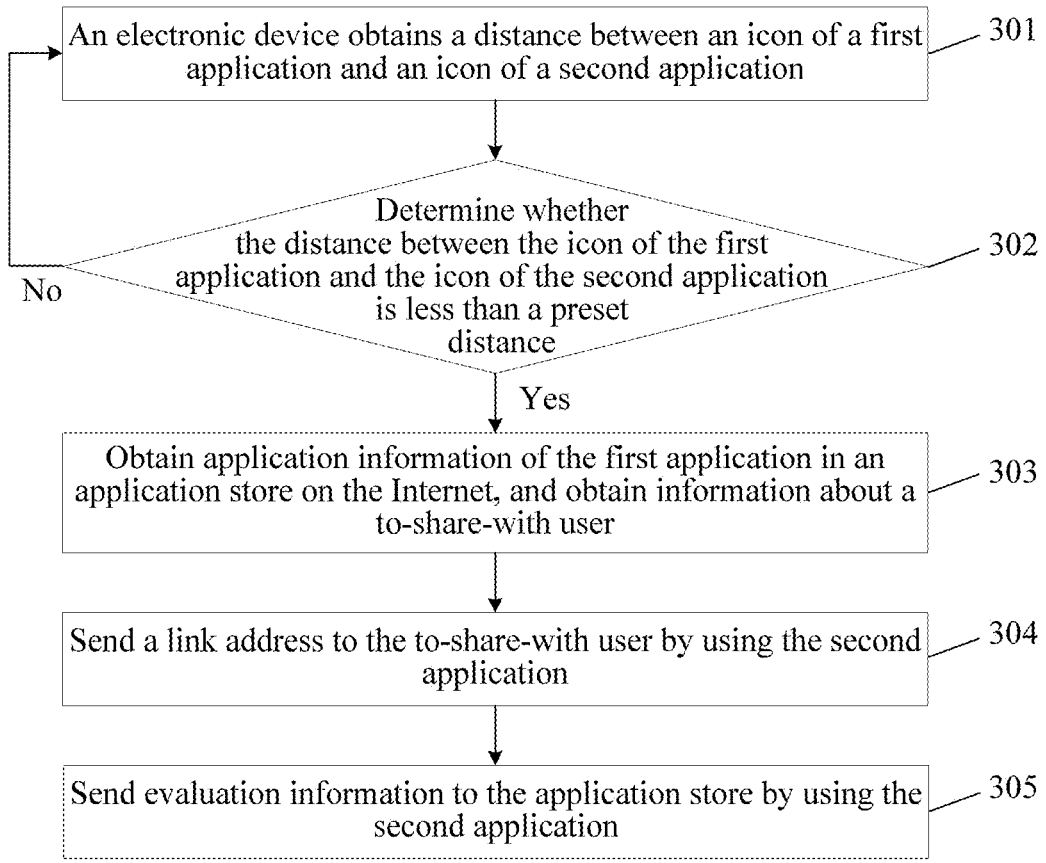
FIG. 3 is a flowchart of an application sharing method in "Scenario 1" according to an embodiment.

Scenario 1 may be a user drags an icon of a first application (a to-be-shared application) by using an electronic device, and an operation of sharing the first application is triggered until a distance between the icon of the first application and an icon of a second application is less than a preset distance. As shown in FIG. 3, Scenario 1 may specifically include the following.

301. The electronic device obtains the distance between the icon of the first application and the icon of the second application.

The first application is a to-be-shared application, and the second application is used to share the first application.

As an implementation manner of this embodiment, after the electronic device downloads and installs an application, an icon of the application may be displayed on a display unit of the electronic device. When a user needs to share the first application, the user may drag the icon of the first application to an icon of any second application by using the electronic device. In this way, the first application may be shared by using the corresponding second application.

To share the first application in time, the electronic device may obtain the distance between the icon of the first application and the icon of the second application in real time.

302. Determine whether the distance between the icon of the first application and the icon of the second application is less than the preset distance, and if the distance is less than the preset distance, perform step 303; if the distance is not less than the preset distance, perform step 301.

As an implementation manner of this embodiment, a preset range is set around the icon of the second application; if the icon of the first application is moved into the preset range, the distance between the icon of the first application and the icon of the second application is less than the preset distance; if the icon of the first application is not moved into the preset range, it indicates that the distance between the icon of the first application and the icon of the second application is not less than the preset distance.

A value of the preset distance is not limited in this embodiment, and may be accordingly set according to actual requirements. For example, the value may be 0.5 centimeter. Details are not described herein again.

303. Obtain application information of the first application in an application store on the Internet, and obtain information about a to-share-with user.

Further, the application information may include, but is not limited to a link address of the first application in the application store and evaluation information on the first application.

Further, the application store on the Internet may obtain the application information of the first application from the application store according to an identifier of the first application, where the identifier of the first application may be, but is not limited to, a unique identifier of the first application.

As an implementation manner of this embodiment, the electronic device may obtain the unique identifier of the first application first, and then obtain a link address corresponding to the unique identifier from the application store. The application store provided by this embodiment may be an application, and a link address of any application may be stored in a file related to the application store.

The unique identifier may specifically be a package name of an installation package of the first application. For example, in an Android system, the package name may be stored in an AndroidManifest.xml file of an application installation package file, and a form of the package name may be manifest package="com. . . . ".

A method for obtaining a link address of an application is not limited in this embodiment, and is a technology well known by a person skilled in the art and may be set according to actual requirements, and details are not described herein again.

The obtaining, by the electronic device, a link address of the first application may include, but is not limited to obtaining the link address of the first application from the installation package of the first application according to the identifier of the first application.

Specifically, when downloading and installing an application, the user writes address information URL corresponding to the application and in the application store into a file of an installation package of the application, to enable a system to automatically extract the address information URL when the system detects that the user recommends the application. For example, for an iOS application, address information URL of a downloaded and installed application may be added to a field in an info.plist file, and for an Android application, address information URL of a downloaded and installed application may be added to a field in an AndroidManifest.xml file. Formats of address information URL may be shown below.

1. For an AndroidManifest.xml file in an Android system:
<url android:address="http://www.1234apk.com/apk/3433/"> </url>

2. For an info.plist file in an iOS system:
<url>
<address>http://www.ruan8.com/soft_12423.html</address>
<url>

Alternatively, the method for obtaining the link address of the first application may further include obtaining the link address of the first application from a stored table of correspondences between identifiers and link addresses of installed applications according to the identifier of the first application.

Each time the user downloads and installs an application, a system automatically writes a URL of the installed application into a URL list of a mobile terminal device. Each time the user recommends an application to another person and drags an icon of the application to an icon of a communications application, and after a system confirms that this action is application recommendation, the system automatically detects a name of the application whose application icon is dragged, queries, according to the name of the application, the URL list maintained by the system for a URL corresponding to the to-be-recommended application, and sends, by using the communications application, a query result to a party to which the application is recommended.

Alternatively, the method for obtaining the link address of the first application may further include obtaining the link address of the first application from the application store on the Internet according to an identifier of the first application, where the application store on the Internet stores a table of correspondences between identifiers and link addresses of applications.

Specifically, a manner of querying a URL online in real time may include the following.

1. An operating system of a mobile phone detects a unique identifier corresponding to an icon of a to-be-recommended client application, where the unique identifier may be specifically a package name of an installation package of the to-be-recommended application.

2. The operating system of the mobile phone requests, from the application store on the Internet, a URL corresponding to the unique identifier of the application, and information related to the application, such as an application name, the number of times that the application is downloaded, and the last application evaluation.

3. The application store on the Internet searches, according to the received unique identifier of the application, for the URL corresponding to the to-be-recommended application and the information related to the application.

4. The application store on the Internet sends the URL corresponding to the application and the information related to the application to the operating system of the mobile phone.

5. After receiving the URL and the information related to the application, the operating system of the mobile phone sends, by using a communications application, the URL and the information related to the application to a party to which the application is recommended.

Further, by using the manner of querying a URL online in real time, not only a link address URL of a recommended application can be requested, but also information related to the application, such as an application name, the number of times that the application is downloaded, and the last application evaluation, can be requested from the application store on the Internet. When recommending an application to another person, the user cannot only send a link address of the recommended application in the application store, but also send other information related to the recommended application and requested from the application store on the Internet to a party to which the application is recommended, that is, information about the to-share-with user.

The method for obtaining the link address by the electronic device is not limited in this embodiment, is not limited to the methods described above, and may be set according to actual requirements, and details are not described herein again.

To simplify steps of sharing an application, the user may share the first application by dragging the icon, and if the user wants to implement the steps of sharing by using an application, the user may drag the icon of the first application to an icon corresponding to the application.

That an icon is dragged to another icon, which is provided by this embodiment, refers to that a distance between the two icons is less than a preset distance, and details are not described hereinafter again.

The icon of the second application may be, but is not limited to an icon of a communications application, an icon of a social application, or an icon of the application store.

The communications application may be, but is not limited to a short message service, BLUETOOTH, or an instant messaging application. The social application may be, but is not limited to a social communications application.

Further, the icon of the second application may be displayed on the display unit all the time.

In this case, the user may directly drag the icon of the first application to the icon of the second application on the display unit, to trigger a sharing operation, that is, to trigger the electronic device to send the link address of the first application to the information about the to-share-with user.

Further, the icon of the second application may also be displayed on the display unit after the icon of the first application is selected.

Figure 4A:
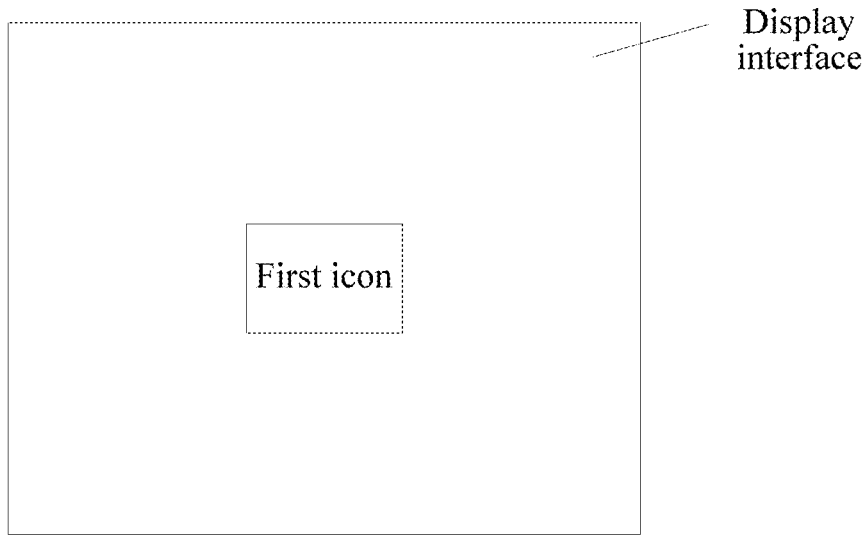
FIG. 4A is a schematic diagram of an image displayed by a display unit before an icon of a first application is selected according to an embodiment.
Figure 4B:
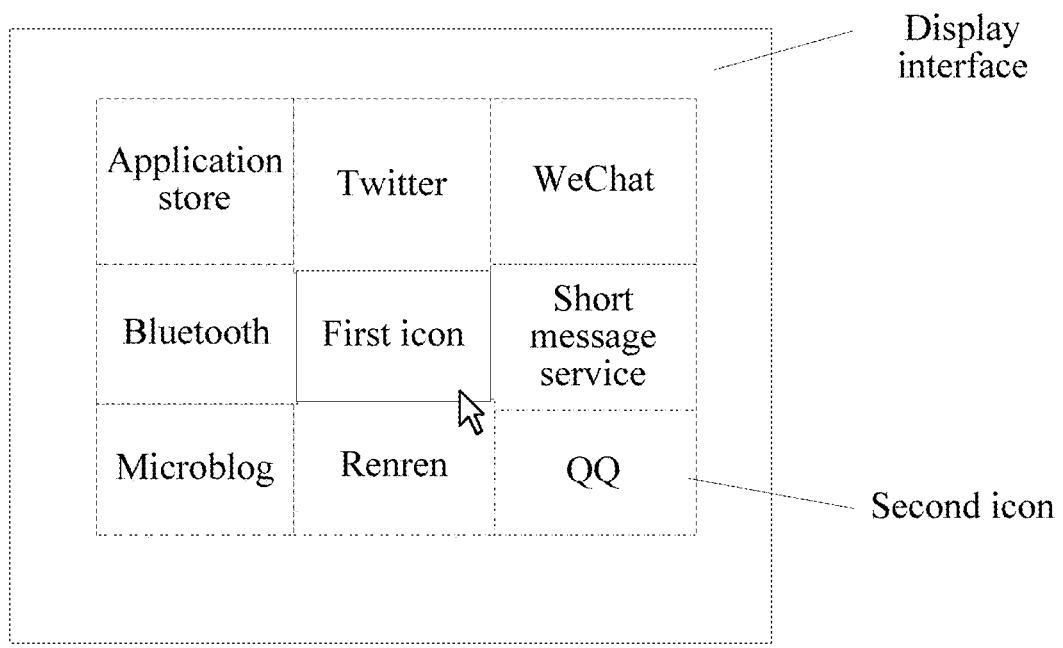
FIG. 4B is a schematic diagram of an image displayed by a display unit after an icon of a first application is selected according to an embodiment.

Specifically, as shown in FIG. 4A, when the icon of the first application is not selected on the display unit, the icon of the second application is not displayed around the icon of the first application. As shown in FIG. 4B, after the icon of the first application is selected on the display unit, the corresponding icon of the second application is displayed around the icon of the first application.

In this case, that the user shares the first application may include the user may tap the icon of the first application on the display unit; after the icon of the first application is selected, the corresponding icon of the second application is displayed around the icon of the first application, and then the user drags the icon of the first application to the corresponding icon of the second application to trigger the sharing operation.

Figure 5:
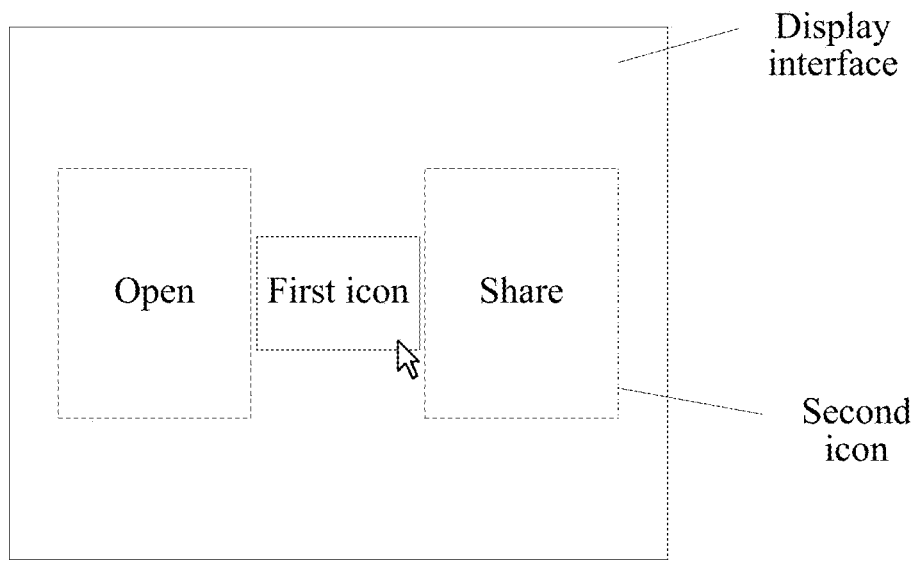
FIG. 5 is another schematic diagram of an image displayed by a display unit after an icon of a first application is selected according to an embodiment.

Alternatively, when the icon of the first application is not selected, the icon of the second application is not displayed around the icon of the first application on the display unit. As shown in FIG. 5, after the icon of the first application is selected, an icon of an Open option may be displayed on the left of the icon of the first application, and an icon of a Share option is displayed on the right of the icon of the first application. If the user needs to open an application corresponding to the icon of the first application, the user drags the icon of the first application to the left, and if the user needs to share the application corresponding to the icon of the first application, the user drags the icon of the first application to the right.

When the icon of the first application is dragged to a corresponding sharing area, a corresponding icon of a communications application or a corresponding icon of a social application is displayed on the display unit. Then the user may select a corresponding icon and uses an application corresponding to the icon as the second application, for example, if a selected icon is instant messaging, instant messaging may be used as the communications application to perform the sharing operation.

A display manner and content of the icon of the second application are not limited in this embodiment, are not limited to the content described above, and may also be another condition. Details are not described herein again.

As an implementation manner of this embodiment, after detecting that the distance between the icon of the first application and the icon of the second application on the display unit is less than the preset distance, the electronic device can execute the second application.

Further, if the second application is a communications application, the information about the to-share-with user may be obtained by using the second application, that is, the user may select a number of a friend that the user needs to share with (that is, the information about the to-share-with user).

Figure 6:
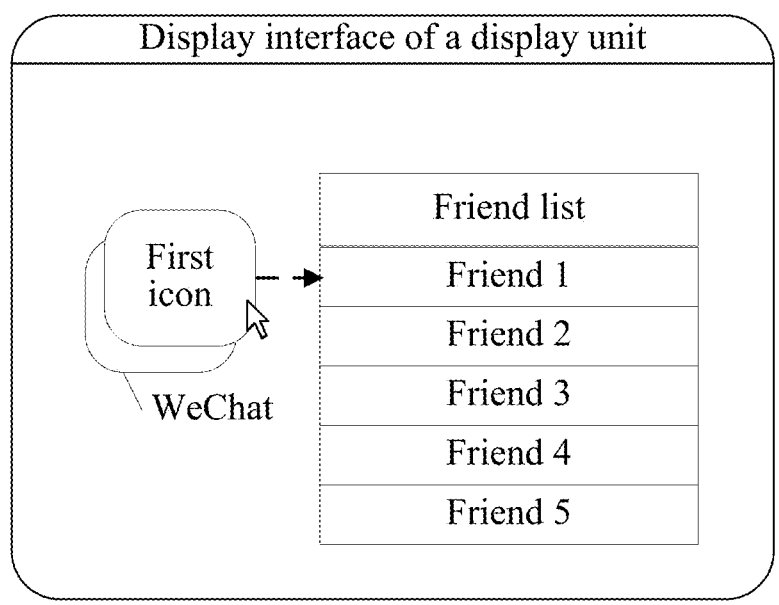
FIG. 6 shows a friend list displayed on a display unit according to an embodiment.

For example, as shown in FIG. 6, the icon of the first application is dragged to the instant messaging icon on the display unit. When a distance between the icon of the first application and the instant messaging icon is less than the preset distance, an instant messaging application is opened. In this case, an instant messaging friend list pops up on the display unit. After the user selects a friend (that is, after the information about the to-share-with user is obtained), the user pushes the link address to the friend (that is, sends the link address to the information about the to-share-with user). After logging in to the received link address, the friend can download the first application from the link address.

If the second application is a social application, the information about the to-share-with user may be obtained by using the second application, where the information about the to-share-with user is stored in a file related to the second application.

For example, when the social application is a Renren application, the first application may be shared on a public home page, and an address of the public home page may be stored in a file related to the Renren application, which is a technology well known by a person skilled in the art, and details are not described herein again.

304. Send a link address to the to-share-with user by using the second application.

305. Send the evaluation information to the application store by using the second application.

As an implementation manner of this embodiment, if the second application is an instant messaging application, after the information about the to-share-with user is obtained by using step 303, the link address is sent to the to-share-with user by using the instant messaging application.

Further, the evaluation information on the first application provided by the user may be further sent to the application store, so that the application store may use the evaluation information as an evaluation of the application in the application store; and rating information of the application provided by the user is sent to the application store, so that the application store may use the rating information as a rating of the application in the application store.

Further, if the icon of the second application is an icon corresponding to the application store, after the icon of the first application is moved to the icon of the second application, an application store program is opened; the electronic device obtains the unique identifier corresponding to the icon of the first application, and obtains the link address corresponding to the unique identifier from the application store; and the link address is sent to an account of a friend, where the friend is a friend added by the user after the user registers an account in the application store application.

It should be noted that an application store client may be a mobile terminal client or a computer desktop client. When a network of the party to which the application is recommended (that is, a network corresponding to the information about the to-share-with user) is unstable or does not have enough traffic to download the first application, it may be considered that an application store client of a computer desktop is used to download the first application.

Because an existing application store does not have many evaluations, it is considered that when the user recommends an application to a friend, not only a link address of the application in the application store is sent to the friend, but also the evaluation information on the first application provided by the user may be further sent to a user evaluation module of the application store, and the rating information of the first application provided by the user may be further sent to a user rating module of the application store. In this way, a piece of evaluation information on the first application or a piece of rating information of the first application provided by the user is added to the application store, so that other users can better understand the application.

Further, when the icon of the first application is dragged to an icon of the application store, the electronic device may further open the first application in the application store after obtaining the link address corresponding to the icon of the first application; or the electronic device may detect the unique identifier corresponding to the icon of the first application, search the application store for an application with the same unique identifier, and open the application with the same unique identifier as the first application.

Figure 7:
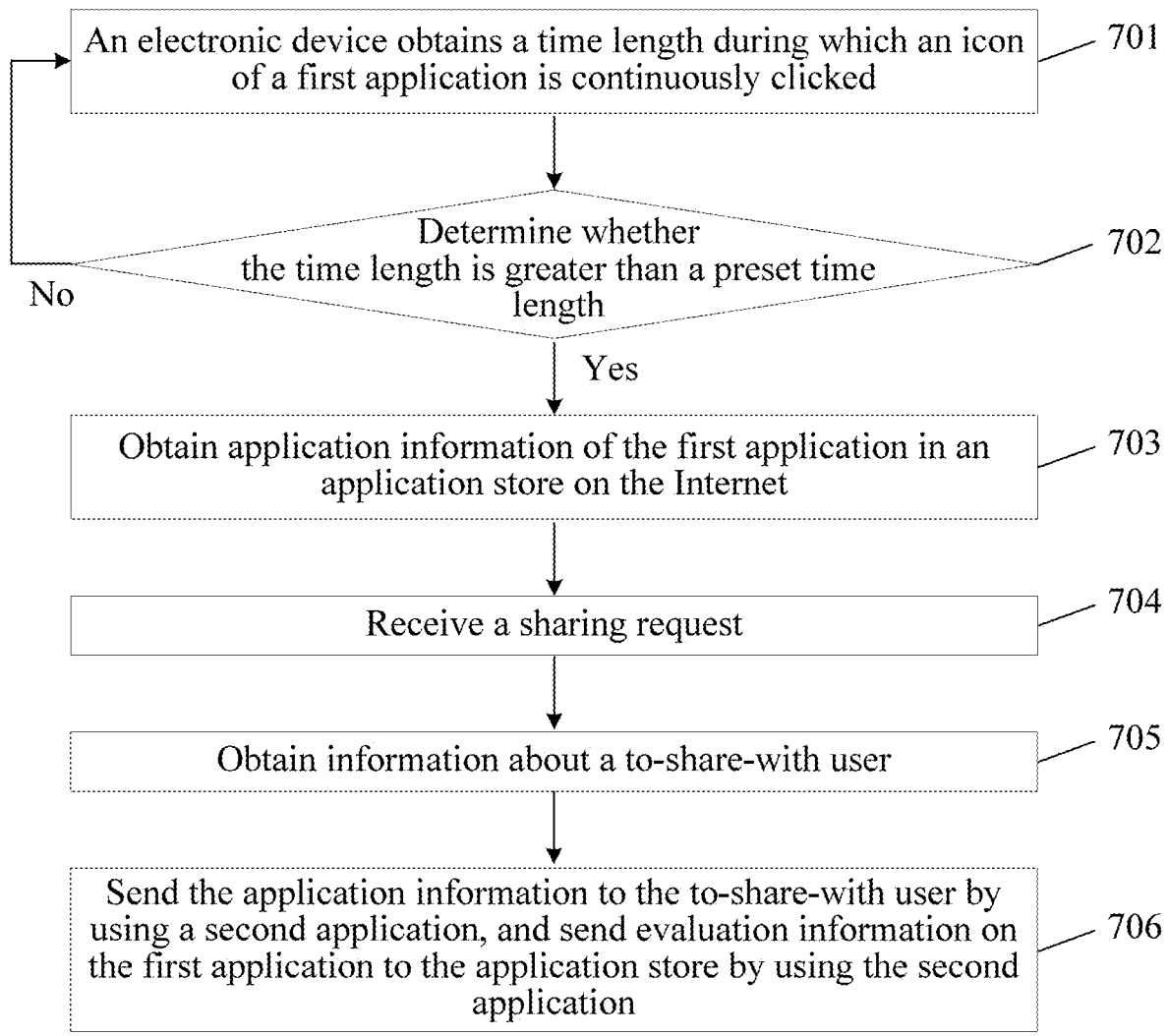
FIG. 7 is a flowchart of an application sharing method in "Scenario 2" according to an embodiment.

Scenario 2 may include sharing of a first application is implemented by continuously tapping for a long time an icon of the first application (the to-be-shared application) displayed on a display unit. As shown in FIG. 7, Scenario 2 may include the following.

701. An electronic device obtains a time length during which the icon of the first application is continuously tapped.

702. Determine whether the time length is greater than a preset time length, and if the time length is greater than the preset time length, perform step 703; if the time length is not greater than the preset time length, perform step 701.

The preset time length is not limited in this embodiment, and may be set according to actual requirements. For example, the preset time length may be 3 s. Details are not described herein again.

As an implementation manner of this embodiment, as shown in FIG. 5, when the time length during which the icon of the first application is continuously tapped is greater than the preset time length, a Share option is displayed on the right of the icon of the first application. After a user selects the Share option, a sharing operation is triggered, and step 703 is performed.

703. Obtain application information of the first application in an application store on the Internet.

This step is similar to the content in step 303, and details are not described herein again.

704. Receive a sharing request.

Further, the sharing request may include, but is not limited to an identifier of a second application. The electronic device may determine an application corresponding to the identifier included in the sharing request, as the second application that executes the sharing operation.

Figure 8:
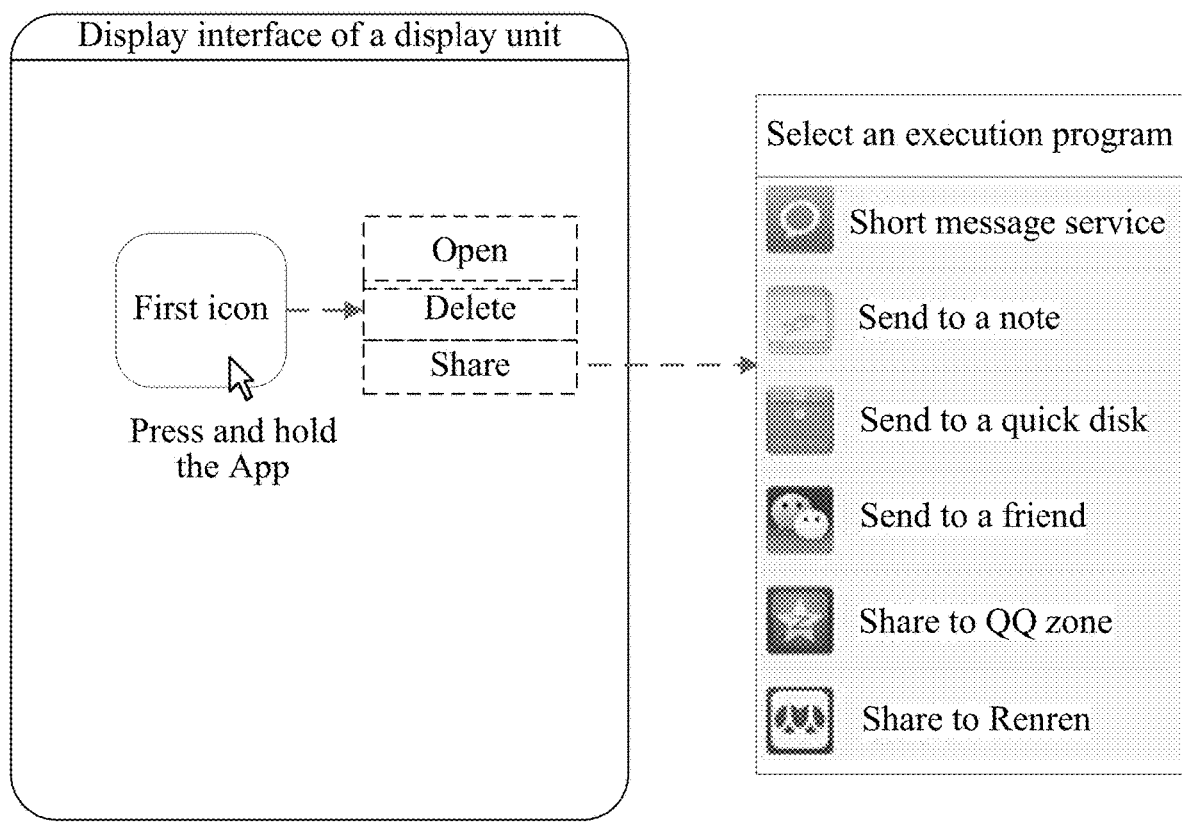
FIG. 8 shows an operation list displayed on a display unit according to an embodiment.

As an implementation manner of this embodiment, as shown in FIG. 8, after the icon of the first application is continuously tapped, a corresponding operation list pops up on the display unit, including Delete, Open, Share, and the like. If the user needs to share an application corresponding to the icon of the first application, the user may tap a sharing area. In this case, a new operation list appears on the display unit, and the operation list may include icons of multiple second applications, where an icon of a second application may be an icon of a communications application, an icon of a social application, or the like. When the user taps an icon of a second application, the electronic device may share the first application by using an application corresponding to the selected icon of the second application.

Specific sharing steps and the icon of the second application have been described in "Scenario 1", and details are not described herein again.

705. Obtain information about a to-share-with user.

This step is similar to the content of obtaining the information of the to-share-with user provided by step 303, and details are not described herein again.

706. Send a link address to the to-share-with user by using the second application, and send evaluation information on the first application to the application store by using the second application.

This step is similar to the content in step 304, and details are not described herein again.

Further, the evaluation information on the first application may be further sent to the application store.

Figure 9:
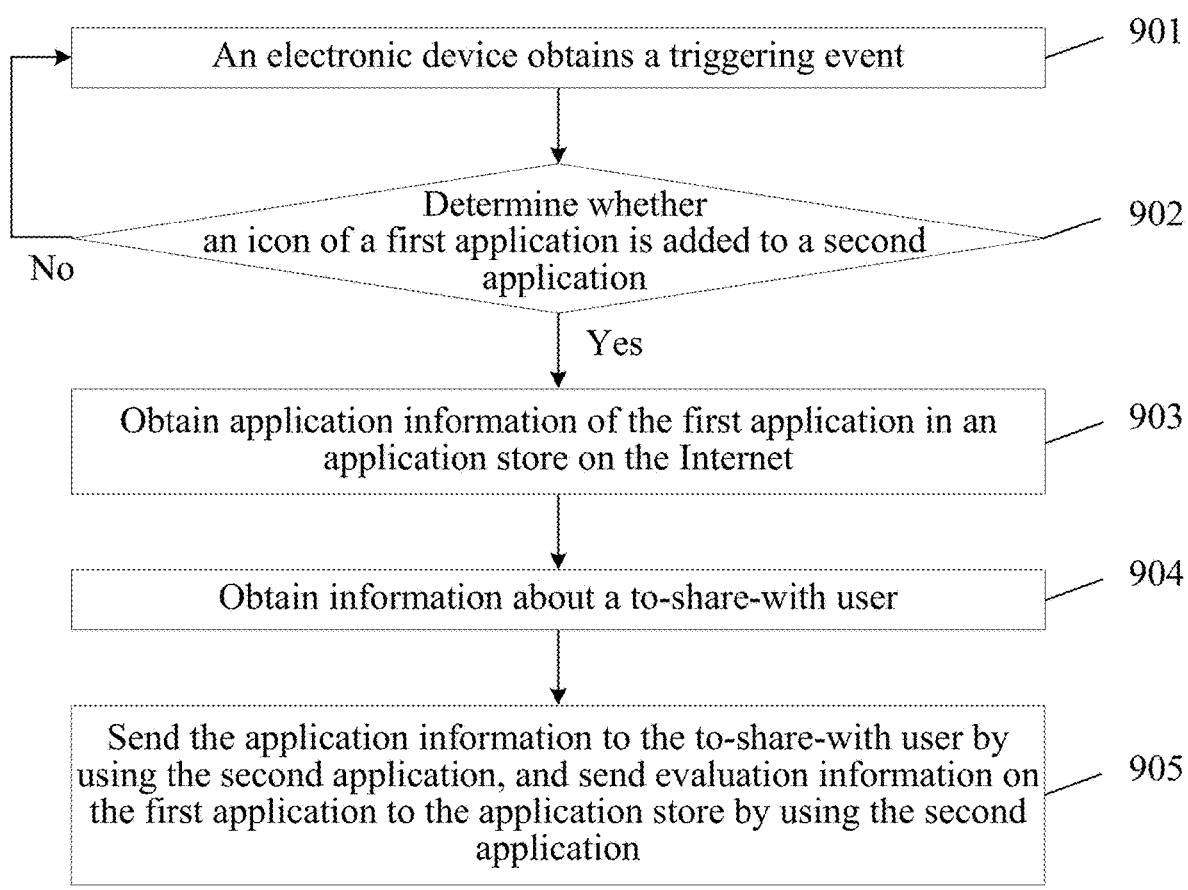
FIG. 9 is a flowchart of an application sharing method in "Scenario 3" according to an embodiment.

Scenario 3 may include open an execution program that executes a sharing operation, and add an icon of a first application to a sharing function in the execution program to implement sharing of the first application. As shown in FIG. 9, Scenario 3 may include the following.

901. An electronic device obtains a triggering event.

Further, the triggering event is used to represent whether the icon of the first application is added to a second application.

Further, the second application may be, but is not limited to a communications application, a social application, or an application store.

The communications application may be, but is not limited to a short message service, BLUETOOTH, or an instant messaging application. The social application may be, but is not limited to a social communications application.

902. Determine whether the icon of the first application is added to the second application, and if the icon of the first application is added to the second application, perform step 903; if the icon of the first application is not added to the second application, perform step 901.

903. Obtain application information of the first application in an application store on the Internet.

This step is similar to the corresponding content in step 303, and details are not described herein again.

904. Obtain information about a to-share-with user.

This step is similar to the corresponding content in step 303, and details are not described herein again.

905. Send a link address to the to-share-with user by using the second application.

This step is similar to the content in step 304, and details are not described herein again.

Further, evaluation information on the first application may be further sent to the application store.

As an implementation manner of this embodiment, to simplify steps of sharing an application, a user may first select the second application that executes a sharing operation, and then add the icon of the first application to the second application for sharing.

Figure 10A:
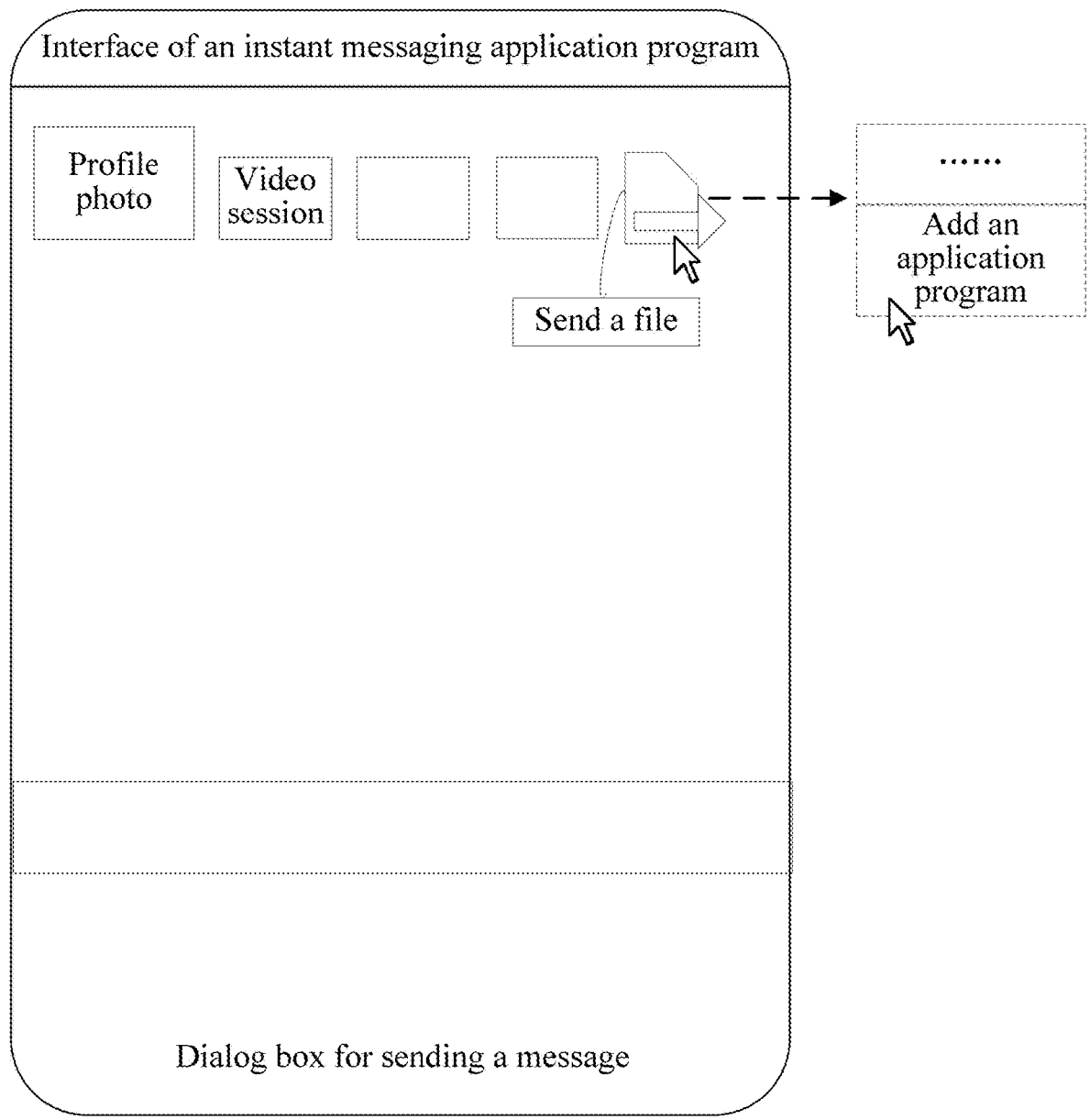
FIG. 10A is a schematic diagram of an operation of triggering an adding function according to an embodiment.
Figure 10B:
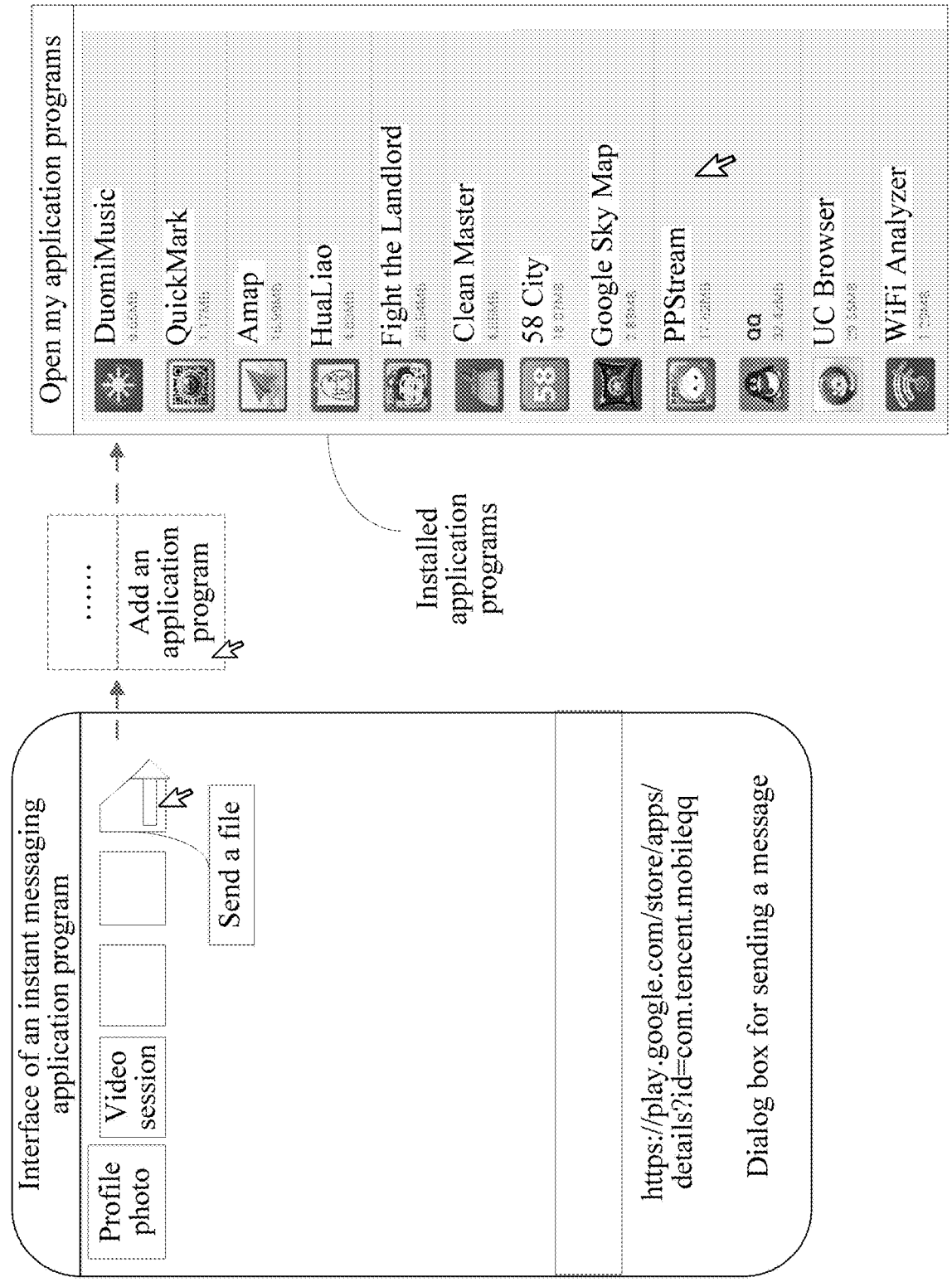
FIG. 10B is a schematic diagram of an operation of an adding function according to an embodiment.

For example, as shown in FIG. 10A, the user opens an instant messaging application, and taps "Send a file" and "Add an application" in sequence. In this case, as shown in FIG. 10B, an operation list is displayed on a display unit, and the operation list may include icons of installed applications in the electronic device, and after the icon of the first application is tapped, the first application is added to a sharing function of the instant messaging application. The electronic device may obtain, according to a unique identifier of the icon of the first application, a link address corresponding to the unique identifier in the application store. Then, the user may further select a friend to share with in the instant messaging application (this step may be performed before the icon of the first application is added or after the icon of the first application is added), so that the link address of the first application is sent to the friend to share with.

This step further includes obtaining the information about the to-share-with user, and a method for obtaining the information about the to-share-with user has been described in step 303, and details are not described herein again.

After the foregoing solution is used, an icon of a second application that can be used to share a first application is displayed on a display unit, and a user can trigger sharing of the first application by operating the icon of the first application, that is, trigger sharing of the first application by using the second application. In this way, any application can be shared, and operation steps for triggering sharing are simplified. Moreover, an electronic device may further select, by using a communications application, a specified friend to share with, and may share the first application with the specified friend. In addition, evaluation information on the first application may also be sent to an application store, so that another user obtains the evaluation information on the first application from the application store.

Some embodiments of virtual apparatuses are provided below, and the apparatus embodiments correspond to the foregoing corresponding method embodiments.

Figure 11:
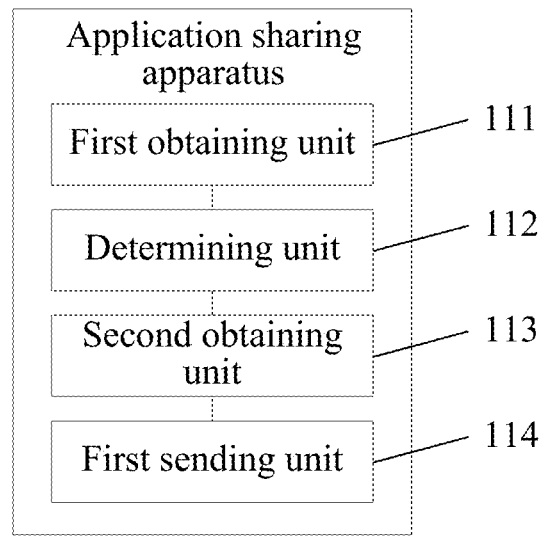
FIG. 11 is a schematic structural diagram of an application sharing apparatus according to an embodiment.

An embodiment provides an application sharing apparatus. As shown in FIG. 11, the apparatus includes a first obtaining unit 111 configured to obtain a distance between an icon of a first application and an icon of a second application, where the first application is a to-be-shared application, and the second application is used to share the first application; a determining unit 112 configured to determine whether the distance is less than a preset distance; a second obtaining unit 113 configured to if the distance is less than the preset distance, obtain application information of the first application in an application store on the Internet, and obtain information about a to-share-with user, where the application information includes a link address of the first application in the application store; and a first sending unit 114 configured to send the link address to the to-share-with user by using the second application.

After the foregoing solution is used, an icon of a second application that can be used to share a first application is displayed on a display unit, and a user can move a position of an icon of the first application on the display unit, and implements and triggers sharing of the first application according to a distance between the icon of the first application and the icon of the second application, that is, triggers sharing of the first application by using the second application. In this way, any application can be shared.

Figure 12:
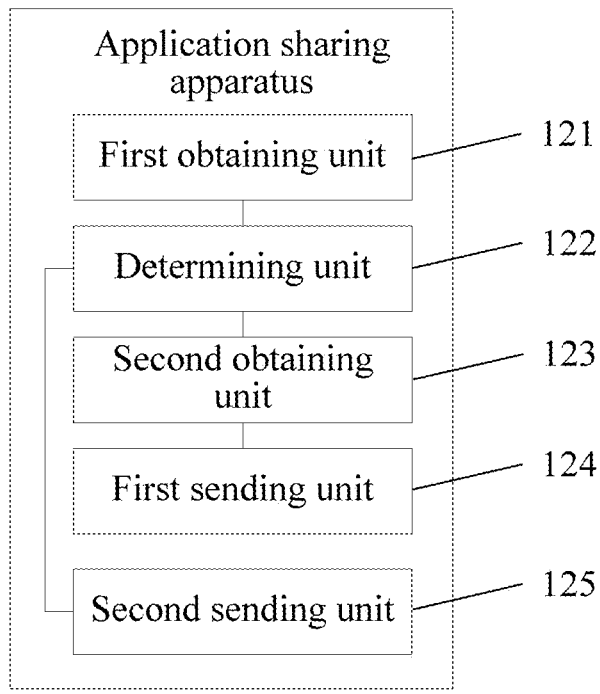
FIG. 12 is a schematic structural diagram of another application sharing apparatus according to an embodiment.

An embodiment provides another application sharing apparatus. This apparatus is a further extension of the apparatus shown in FIG. 11. As shown in FIG. 12, the apparatus may include a first obtaining unit 121 configured to obtain a distance between an icon of a first application and an icon of a second application, where the first application is a to-be-shared application, and the second application is used to share the first application; a determining unit 122 configured to determine whether the distance is less than a preset distance; a second obtaining unit 123 configured to if the distance is less than the preset distance, obtain application information of the first application in an application store on the Internet, and obtain information about a to-share-with user, where the application information includes a link address of the first application in the application store;

and a first sending unit 124 configured to send the link address to the to-share-with user by using the second application.

Further, the apparatus further includes a display unit, and the icon of the second application is displayed on the display unit after the icon of the first application is selected.

Further, the icon of the second application is displayed on the display unit all the time.

Further, the icon of the second application is displayed on the display unit after the icon of the first application is selected.

Further, the icon of the second application displayed on the display unit is an icon of a communications application, an icon of a social application, or an icon of the application store.

Further, the second application may be, but is not limited to a communications application, a social application, or the application store.

Further, the application information obtained by the second obtaining unit further includes evaluation information on the first application.

The apparatus further includes a second sending unit 125 configured to after the determining unit determines whether the distance is less than the preset distance, if the distance is less than the preset distance, send the evaluation information to the application store.

Further, the second obtaining unit 123 is specifically configured to obtain the link address of the first application from an installation package of the first application according to an identifier of the first application; or obtain the link address of the first application from a stored table of correspondences between identifiers and link addresses of installed applications according to an identifier of the first application; or obtain the link address of the first application from the application store on the Internet according to an identifier of the first application, where the application store on the Internet stores a table of correspondences between identifiers and link addresses of applications.

After the foregoing solution is used, an icon of a second application that can be used to share a first application is displayed on a display unit, and a user can trigger sharing of the first application by operating the icon of the first application, that is, trigger sharing of the first application by using the second application. In this way, any application can be shared, and operation steps for triggering sharing are simplified. Moreover, an electronic device may further select, by using a communications application, a specified friend to share with, and may share the first application with the specified friend. In addition, evaluation information on the first application may also be sent to an application store, so that another user obtains the evaluation information on the first application from the application store.

Through the descriptions of the foregoing embodiments, a person skilled in the art may clearly understand that the present disclosure may be implemented by software in addition to necessary universal hardware and certainly, may also be implemented by hardware. In most circumstances, the former is a better implementation manner. Based on such an understanding, the technical solutions of the present disclosure essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, or a network device) to perform the methods described in the embodiments of the present disclosure.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method applied to an electronic device with a screen, wherein the screen displays a display interface, and wherein the method comprises:
    displaying an icon of a first application;
    displaying a first operation list when a time length during which the icon of the first application is continuously tapped is greater than a preset time length, wherein the first operation list includes a share option;
    selecting the share option to share the first application;
    displaying an icon of a second application that is configured to share the first application in response to selecting the share option, wherein the icon of the second application is displayed in an application list separate from the first operation list of the share option, and wherein the application list includes one or more icons of applications corresponding to one or more execution programs on the electronic device;
    receiving a tap of the icon of the second application;
    obtaining, application information of the first application in an application store on the Internet, wherein the application information comprises a link address of the first application in the application store; and wherein the obtaining the application information in the application store on the Internet comprises querying a Uniform Resource Locator (URL) online in real time by:
        detecting a unique identifier corresponding to the first application;
        requesting, by the electronic device, from the application store on the Internet, the URL corresponding to the unique identifier; and
        receiving, by the electronic device, from the application store on the Internet, the URL; and
    sharing the application information of the first application using the second application.

2. The method of claim 1, further comprising:
    triggering the second application to obtain application information of the first application in an application store on the Internet, wherein the application information comprises a link address of the first application in the application store;
    triggering the second application to obtain information about a to-share-with user; and
    sending the link address to the to-share-with user using the second application.

3. The method of claim 2, wherein the second application is a communications application, and wherein obtaining the information about the to-share-with user comprises obtaining the information about the to-share-with user using the second application.

4. The method of claim 2, wherein the application information further comprises evaluation information on the first application.

5. The method of claim 2, wherein obtaining the application information of the first application in the application store on the Internet comprises obtaining the link address of the first application from an installation package of the first application according to the unique identifier of the first application.

6. The method of claim 1, wherein displaying the first operation list when the time length during which the icon of the first application is continuously tapped is greater than the preset time length comprises displaying the first operation list and the icon of the first application in a same display interface when a time length during which the icon of the first application is continuously tapped is greater than the preset time length.

7. An electronic device comprising:
a screen configured to display a display interface; a non-transitory memory comprising instructions; and
a processor coupled to the screen and the non-transitory memory, the instructions being executed by the processor to cause the electronic device to:
display an icon of a first application;
display a first operation list when a time length during which the icon of the first application is continuously tapped is greater than a preset time length, wherein the first operation list includes a share option;
select the share option to share the first application;
display an icon of a second application that is configured to share the first application in response to selecting the share option, wherein the icon of the second application is displayed in an application list separate from the first operation list of the share option, and wherein the application list includes one or more icons of applications corresponding to one or more execution programs on the electronic device;
tap the icon of the second application;
obtain, application information of the first application in an application store on the Internet, wherein the application information comprises a link address of the first application in the application store; and wherein the obtaining the application information in the application store on the Internet comprises querying a Uniform Resource Locator (URL) online in real time by:
detecting a unique identifier corresponding to the first application;
requesting, by the electronic device, from the application store on the Internet, the URL corresponding to the unique identifier; and
receiving, by the electronic device, from the application store on the Internet, the URL; and
share the application information of the first application using the second application.

8. The electronic device of claim 7, wherein the instructions further cause the electronic device to:
trigger the second application to obtain application information of the first application in an application store on the Internet, wherein the application information comprises a link address of the first application in the application store;
trigger the second application to obtain information about a to-share-with user; and
send the link address to the to-share-with user using the second application.

9. The electronic device of claim 8, wherein the second application is a communications application, and wherein the instructions further cause the electronic device to obtain the information about the to-share-with user using the second application.

10. The electronic device of claim 8, wherein the application information further comprises evaluation information on the first application.

11. The electronic device of claim 8, wherein the instructions further cause the electronic device to obtain the link address of the first application from an installation package of the first application according to the unique identifier of the first application.

12. The electronic device of claim 7, wherein the instructions further cause the electronic device to display the first operation list and the icon of the first application in a same display interface when a time length during which the icon of the first application is continuously tapped is greater than the preset time length.

13. A computer program product embodied in a non-transitory computer readable medium and comprising computer instructions for:
displaying an icon of a first application on an electronic device;
displaying a first operation list when a time length during which the icon of the first application is continuously tapped is greater than a preset time length, wherein the first operation list includes a share option;
selecting the share option to share the first application;
displaying an icon of a second application that is configured to share the first application in response to selecting the share option, wherein the icon of the second application is displayed in an application list separate from the first operation list of the share option, and wherein the application list includes one or more icons of applications corresponding to one or more execution programs on the electronic device;
tapping the icon of the second application;
obtaining, application information of the first application in an application store on the Internet, wherein the application information comprises a link address of the first application in the application store; and wherein the obtaining the application information in the application store on the Internet comprises querying a Uniform Resource Locator (URL) online in real time by:
detecting a unique identifier corresponding to the first application;
requesting, by the electronic device, from the application store on the Internet, the URL corresponding to the unique identifier; and
receiving, by the electronic device, from the application store on the Internet, the URL; and
sharing the application information of the first application using the second application.

14. The computer program product of claim 13, wherein the computer program product further comprises computer instructions for:
triggering the second application to obtain application information of the first application in an application store on the Internet, wherein the application information comprises a link address of the first application in the application store;
triggering the second application to obtain information about a to-share-with user; and
sending the link address to the to-share-with user using the second application.

15. The computer program product of claim 14, wherein the second application is a communications application, and wherein the computer program product further comprises computer instructions for obtaining the information about the to-share-with user using the second application.

16. The computer program product of claim 14, wherein the computer program product further comprises computer instructions for obtaining the link address of the first application from an installation package of the first application according to the unique identifier of the first application.

17. The computer program product of claim 13, wherein the computer program product further comprises computer instructions for displaying the first operation list and the icon of the first application in a same display interface when a time length during which the icon of the first application is continuously tapped is greater than the preset time length.

* * * * *